United States Patent [19]

Berman et al.

[11] 4,427,930

[45] Jan. 24, 1984

[54] ELECTRIC VEHICLE CURRENT REGULATOR

[75] Inventors: Max Berman, Charlottesville; William G. Klimmek, Earlysville; Charles E. Konrad, Roanoke, all of Va.

[73] Assignee: General Electric Company, Salem, Va.

[21] Appl. No.: 333,931

[22] Filed: Dec. 23, 1981

[51] Int. Cl.³ .............................................. H02K 27/20
[52] U.S. Cl. .................................. 318/301; 318/319; 318/326; 318/342
[58] Field of Search ........... 318/386, 388, 349, 345 C, 318/345 G, 301, 309, 138, 139, 439, 434, 268, 317, 318, 319, 326, 342

[56] References Cited

U.S. PATENT DOCUMENTS 3,868,554  2/1975  Konrad ........................ 318/345 C X
4,381,479  4/1983  Wesling et al. ..................... 318/317

FOREIGN PATENT DOCUMENTS 1218231  1/1971  United Kingdom .
1465369  2/1977  United Kingdom .

OTHER PUBLICATIONS

Cohn et al., *A Step by Step Introduction to 8080 Microprocessor Systems*, Dilithium Press, Forest Grove, Oregon, pp. 1-5.

*Primary Examiner*—Ulysses Weldon
*Attorney, Agent, or Firm*—Ormand R. Austin; Arnold E. Renner

[57] ABSTRACT

A current regulator for a dc electric traction motor propelled vehicle, implemented using a microcomputer, incorporates an accelerator response characteristics of an accelerator in an internal combustion engine powered vehicle. The regulator uses a current feedback loop to regulate motor torque to the value called for by the accelerator. However, of the magnitude of voltage as a percentage of available source voltage required to generate the desired current exceeds the percentage displacement of the accelerator, the applied voltage is limited to the percent accelerator displacement.

3 Claims, 15 Drawing Figures

Microfiche Appendix Included
(1 Microfiche, 39 Pages)

ELECTRIC VEHICLE CURRENT REGULATOR

Reference is made to microfiche appendix which sets forth a computer program listing including that which is applicable to the present invention. Included are 1 microfiche containing a total of 39 frames. Cross reference is made to related application Ser. No. 333,928, "Plug Current Regulator", assigned to General Electric Company and filed currently herewith.

BACKGROUND OF THE INVENTION

The present invention is directed to power control systems for electric traction motor propelled vehicles and, more particularly, to an accelerator position responsive control system capable of reacting to each increment of accelerator movement throughout the full range of movement.

The response of an internal combustion engine in a vehicle to accelerator movement tends to be substantially linear, i.e., the engine RPM varies, under constant load, for each increment of movement of the accelerator, with maximum torque being developed with maximum accelerator displacement. An operator switching from an internal combustion engine powered vehicle to a direct current traction motor powered vehicle could more easily adjust to the electric vehicle if the accelerator response were similar. However, such is not normally true.

In present day electric vehicles, electronic power regulators are used to control the torque, or speed, developed by the electric traction motors. Typically, the regulator comprises a time-ratio or chopper circuit which varies the power developed by the motors by controlling the percentage of time that the motors are connected directly to a power source. For maximum mobility, the power source is a battery, which limits the available power to the motors. The regulator also includes apparatus responsive to accelerator position for varying the mark-space ratio of the chopper circuit.

In some systems the accelerator position is translated directly into mark-space ratio, i.e., mid-position corresponds to 50 percent conduction of the chopper circuit and full displacement corresponds to 100 percent conduction. However, at very low speeds, such a system produces very high torques with small accelerator displacement since the counter electromotive force of the motor is speed dependent. In practice, such systems result in available torque control at low speed being confined to the first 30 percent of accelerator movement tending to make the accelerator very sensitive.

In some other electric vehicle systems motor current is made directly proportional to accelerator position. This latter type of system has good performance at low speeds; however, at higher speeds where the application of full voltage to the motor results in a low value of current due to the large counter EMF, the maximum value of current may be obtained with as little as one-sixth of the total pedal displacement.

It is an object of the present invention to provide an improved torque/speed regulator for an electric motor. It is another object of the present invention to provide an improved torque/speed regulator for an electric motor powered vehicle which regulator is responsive to incremental accelerator movement over the full accelerator displacement range.

SUMMARY OF THE INVENTION

A current regulating system is incorporated in a microcomputer control for a switching regulator connected for controlling the application of power to a DC electric traction motor. In an electric vehicle application, a vehicle mounted accelerator provides a desired motor torque command in the form of a desired current signal. The microcomputer control system monitors actual motor current and responds to the desired motor current signal to regulate the actual motor current to the desired value so long as the actual current does not require that the percent conduction time of the switching regulator exceed the percent displacement of the accelerator. If the required conduction time exceeds the accelerator displacement, the percent conduction time is limited to the percent accelerator displacement. The control system thereafter supplies gating signals to the switching regulator for implementing the conducting and non-conducting time intervals. In one arrangement the microcomputer incorporates an initialization sequence upon actuation which inhibits the energization of the switching regulator for a predetermined time interval to assure closing of power switching contacts coupling a power source to the control system and motor. Preferably the actual motor current signal is obtained by reading motor current at a fixed time interval in each cycle of operation, the time interval occurring a predetermined time before termination of each conducting time interval.

DESCRIPTION OF THE DRAWING

The novel features which are believed to be characteristic of the invention are set forth in the appended claims. The invention itself, however, both as to its advantages and objects thereof may best be understood by reference to the following description taken in conjunction with the accompanying drawing in which:

FIG. 9 is a graphical representation of the operation of the disclosed system in a plugging mode.

DETAILED DESCRIPTION

Figure 1:
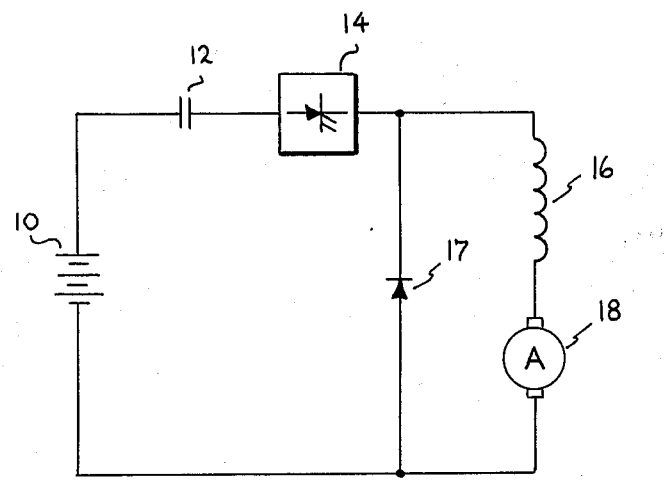
FIG. 1 is a simplified schematic diagram of DC electric motor power circuit.

The principal elements in a power circuit of a battery powered direct current series motor control system are shown in FIG. 1. A battery 10 is connected to a positive power bus through contactor tips 12. A time ratio control power modulating circuit (chopper) 14 connects bus 11 to a field winding 16 and an armature 18 of a series motor. A flyback diode 17 connected across the series combination of field 16 and armature 18 provides a motor current path when chopper 14 is non-conductive. In operation the main line contactor tips 12 are closed and the power supplied to the series motor is regulated by the time ratio or mark-space ratio of the electronic chopper 14. In an electric vehicle application, the operator must control the time ratio output of the chopper 14 through position of an accelerator pedal (not shown) and rely upon the relationship between the accelerator pedal position and mark space ratio to control vehicle torque or speed.

Figure 2:
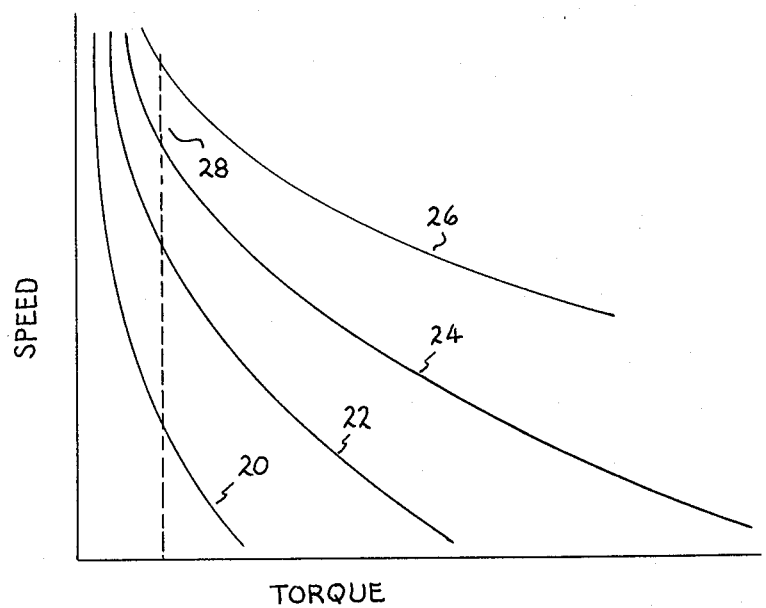
FIG. 2 is a graphical representation of the torque/speed characteristics of a DC motor with constant voltage excitation.

The characteristic curves for a typical traction motor are illustrated in FIG. 2 where the abscissa is torque and the ordinate is speed. The curves 20, 22, 24 and 26 represent the torque/speed relationship of a series traction motor with varying levels of applied voltage. Curve 26 represents the characteristic for high value of applied voltage and curve 20 represents the characteristic for a lower level of applied voltage. In a typical traction motor application, such as a battery powered forklift truck which operates at speeds so low that wind is a negligible factor, the torque required to move the truck at any velocity is independent of velocity and based only upon the rolling friction coefficient, the tires, the gross weight of the vehicle and the gear ratio. Characteristic curve 28 is typical of the load characteristic required to drive such a vehicle at various speeds. Since for a given value of battery potential, the voltage applied to the motor is simply a product of the percent conduction time of chopper 14 and battery potential, then characteristic curves 20, 22, 24, and 26 could also be available as direct functions of the chopper mark-space ratio. In the usual electric vehicle application, the accelerator pedal position is translated directly into mark-space ratio, i.e., 100 percent pedal would correspond to 100 percent conduction time, 50 percent pedal would correspond to 50 percent conduction time and 10 percent depression of the accelerator pedal would correspond to 10 percent conduction time. Thus, the balancing speed, which is represented by the intersection of the load curve 28 and percent on-time speed torque characteristics 20, 22, 24 and 26 each corresponding to a particular pedal depression, determines the speed of the motor. With full pedal depression, the motor accelerates up to the maximum speed determined by the intersection of curves 26 and 28. With a lesser pedal depression corresponding to characteristic curves 24, 22 or 20, the speed is correspondingly less. It is therefore possible to regulate the speed of the vehicle. However, note at very, very low speed one obtains very high torque for a very small pedal depression. For example, in characteristic curve 24, which possibly corresponds to only 30 or 40 percent pedal depression, one obtains a torque far in excess of that required to move a vehicle. In addition, in practice the electronic chopper 14 is limited in maximum current by a current protection system and, in a typical system, 30 percent battery voltage supplied to the motor is sufficient to reach the maximum current level capability of the electronic chopper. Thus at close to zero speed, all of the torque control would be confined to the first 30 percent of accelerator pedal depression thereby tending to make the pedal very sensitive over that range and unresponsive over 70 percent of its range.

Figure 3:
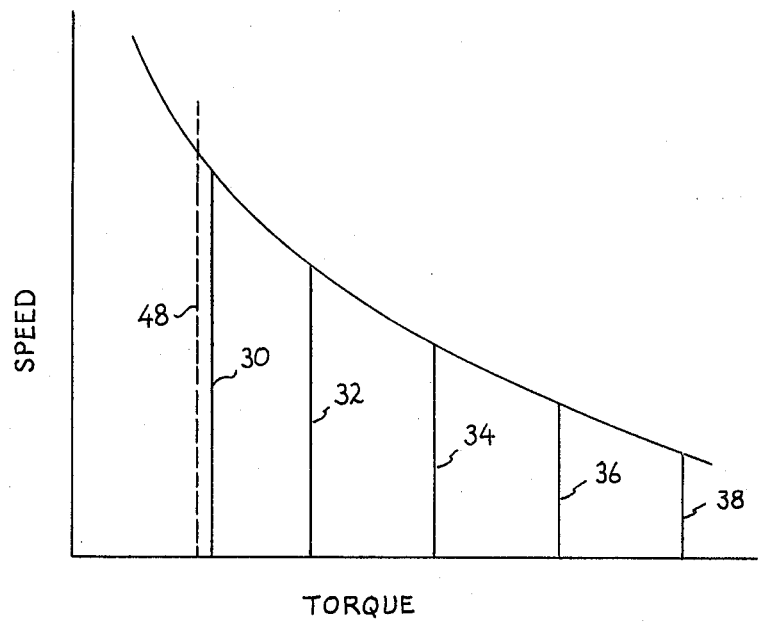
FIG. 3 is a graphical representation of the torque/speed characteristics of a DC motor with constant current excitation.

Other systems for controlling the torque in an electric vehicle make motor current rather than voltage, directly proportional to accelerator pedal position. The characteristics one would obtain from such a control are illustrated in FIG. 3 where the ordinate is speed and the abscissa again is torque. The outer envelope 26 is the motor torque/speed curve with maximum applied voltage. Characteristic curves 30, 32, 34, 36 and 38 are the torque speed curves at five different levels of constant motor current. Considering, for example, the operation on characteristic curve number 30, which might correspond to a 20 percent depression of the accelerator pedal, the system would provide 20 percent of the maximum capability of the chopper 14 at a very low voltage. As the motor speed increases, it would continue to operate on this same curve moving vertically away from the torque axis with the motor terminal voltage increasing as speed increases to counterbalance the effect of the motor generated EMF and maintain the voltage difference necessary to keep that level of current flowing through the armature and field resistances. Eventually, as the speed increased, it would reach a point where full battery voltage must be applied to the motor in order to maintain that desired level of current. This point corresponds to the intersection of the characteristic curve 30 on the outer envelope 26. The curve designated 48 represents the characteristic load curve for a heavy traction type vehicle where windage is not a factor. It will be appreciated that the current regulated type of control system has very good performance at low speed since any increase in pedal depression from 0 to 100 percent transitions along the torque axis through characteristic curves 30, 32, 34, 36 and 38, where 38 corresponds to the maximum current capability of the electronic chopper 14. Thus, the full current, i.e., torque, capability of chopper 14 corresponds to full pedal depression of the accelerator. However, since the load characteristic curve 48 is parallel to the pedal characteristic curves 30, 32, 34, 36 and 38, for a given weight of vehicle there is no one given pedal position which will maintain any fixed speed but rather there will be one pedal position which exactly balances the tractive effort necessary to maintain a constant speed of the vehicle.

For example, if balancing torque occurs at 75 percent pedal depression when the vehicle is traveling at 5 miles per hour, 75 percent pedal depression will also maintain vehicle speed at 10 miles per hour. Thus, in the upper speed region, accelerator pedal sensitivity is similar to that in the voltage control system at lower speeds providing poor operator "feel".

Figure 4:
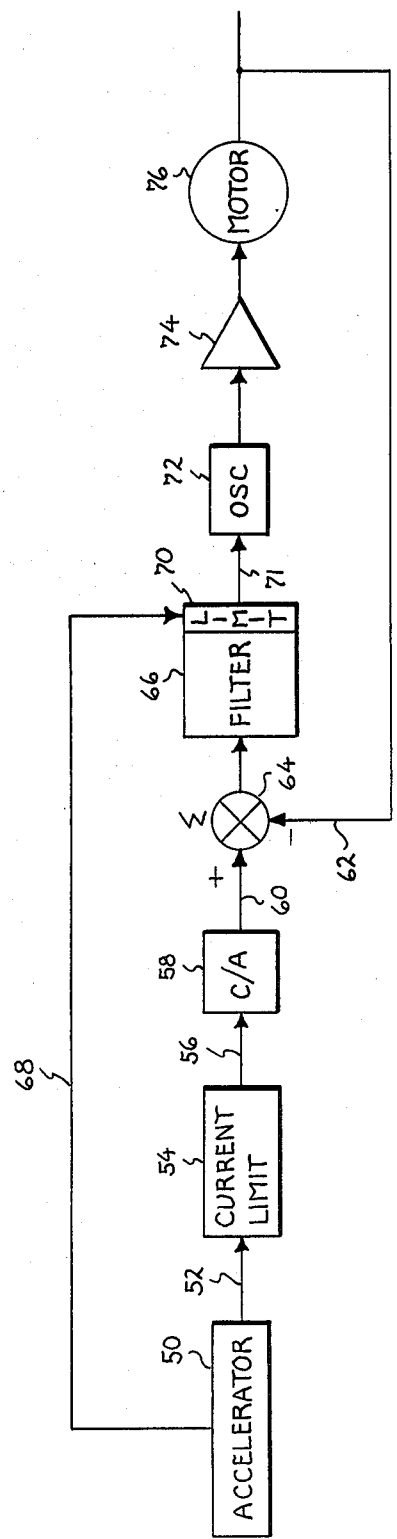
FIG. 4 is a functional block diagram of a DC motor control system in accordance with the concepts of the present invention.

Referring now to FIG. 4 there is shown a functional block diagram of a regulator system according to the present invention. An accelerator 50 provides a current reference signal on line 52 and a voltage reference signal on line 68. The signal on line 52 is a current reference which is directly proportional to accelerator depression, i.e., 100 percent accelerator depression provides 100 percent output in current reference which corresponds to the maximum capability of the power source. The signal on line 52 is coupled to an input terminal of a current limit circuit 54 which may reduce the current reference signal in the event of an over-temperature or other monitored condition. The signal output of current limit circuit 54 is coupled via line 56 to a control acceleration circuit 58 which limits the rate of increase of the current reference signal from a present value to a new value. The signal output from the control acceleration circuit 58 is coupled via line 60 to an input terminal of a summing junction 64. The signal on line 60 is compared to the measured motor current in summing junction 64.

A filter circuit 66 has an input terminal connected to an output terminal of junction 64. Filter circuit 66 limits the rate of increase of the signal from junction 64. Connected to the filter circuit 66 is a limit circuit 70 which is designed to restrict the signal output of the filter circuit 66 on a percentage basis to be equal to or less than the percent pedal depression corresponding to the voltage reference signal on line 68. In other words the signal output from filter circuit 66 cannot exceed the percent of its range represented by the percent of accelerator pedal depression, i.e., if the accelerator pedal is depressed 50 percent, then the signal from filter circuit 66 cannot exceed 50 percent of its maximum value. The limit circuit 70 is controlled by the voltage reference signal on line 68 from accelerator 50.

The signal from circuit 70 is provided via line 71 to an oscillator 72 whose mark-space ratio corresponds to the percent on-time represented by the signal on line 71 i.e., when the signal on line 71 attains 50 percent of its maximum value, the oscillator 72 provides a 50 percent mark-space ratio output signal. The signal from oscillator 72 is coupled to a power amplifier 74 which regulates current in motor 76. Motor current is sensed and a signal representative thereof is coupled via line 62 to summing junction 64.

The regulator system outlined in FIG. 4 is thus comprised of a reference generating section including accelerator 50, current limit circuit 54 and control acceleration circuit 58 which generates a current reference signal on line 60 proportional to pedal depression with maximum current limits subject to the power and temperature limits of the power unit. The rate at which the current reference can be increased is constrained by the control acceleration circuit 58 to a constant rate and since the torque of a dc traction motor is proportional to current, the rate of torque increase is a constant. This tends to provide a better responsiveness independent of speed. The pedal depression also generates a motor voltage limit reference signal which is proportional to pedal depression to limit the maximum motor voltage to a value proportional to pedal depression. A current regulating loop comprised of filter circuit 66 which responds to the difference between the current reference signal on line 60 and the measured motor current signal on line 62 for adjusting the oscillator 72, and power amplifier 74 regulate current in motor 76. The effect of voltage limit circuit 70 is to shift the control mode from current to voltage regulation to improve the speed control at higher speeds.

Figure 5:
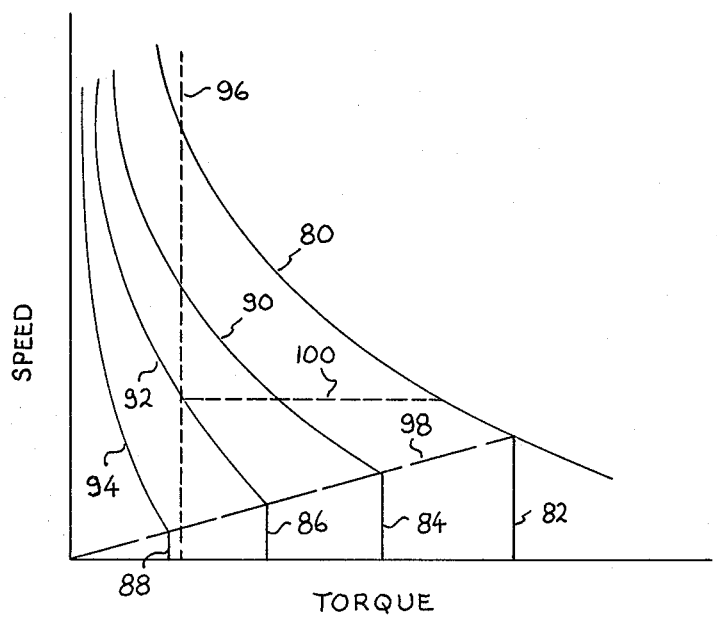
FIG. 5 is a graphical representation of the torque/speed characteristics of a DC motor controlled in accordance with the present invention.

The operation of the regulator of FIG. 4 may be better evaluated by reference to FIG. 5 where speed is once again the ordinate and torque the abscissa. The transition line 98 delineates the division of the torque-speed plane between voltage and current regulation. The vertical lines 82, 84, 86, and 88 represent the constant current outputs at 100, 75, 50 and 25 percent pedal depression, respectively. The characteristic lines 80, 90, 92 and 94 represent the constant voltage torque/speed curves at 100, 75, 50 and 25 percent of battery voltage respectively. The vertical dashed line 96 is the required load torque representing the tractive effort necessary to overcome the rolling friction for a given vehicle weight. If the vehicle was initially assumed to be at rest, and speed assumed to be equal to zero and the pedal depressed 25 percent, corresponding to the current line 88, the vehicle would not move since the developed torque would be less than the load torque. Should the pedal be depressed to 50 percent corresponding to the current line 86, the developed torque would exceed the load torque and the vehicle would begin to move. As the speed increases, the motor terminal voltage will also increase to the value necessary to maintain 50 percent current. When a speed is reached which corresponds to the intersection of characteristic line 86 with characteristic line 98, the motor terminal voltage will reach 50 percent battery voltage corresponding to a mark-space ratio of 50 percent. The voltage limit circuit 70 will then limit the mark-space ratio to 50 percent forcing continued acceleration to follow the constant motor voltage line 92 to the intersection with load torque line 96. The intersection point is referred to as the balancing speed point since the developed torque exactly balances the load torque. If the accelerator pedal is then depressed completely, the torque will increase along the line 100, with the rate of torque increase dictated by the control acceleration circuit 58, until the mark-space ratio reaches 100 percent or full battery voltage is applied to the motor terminals. The vehicle will accelerate at a rate proportional to the difference between the lines 80 and 96 until the near balancing speed represented by the intersection between lines 80 and 96 is reached. If the accelerator pedal is then relaxed and again completely depressed, the motor torque will first be reduced to zero and thereafter increased to the value corresponding to the intersection of lines 80 and 96 with the rate of increase determined by the control acceleration circuit 58.

Figure 6:
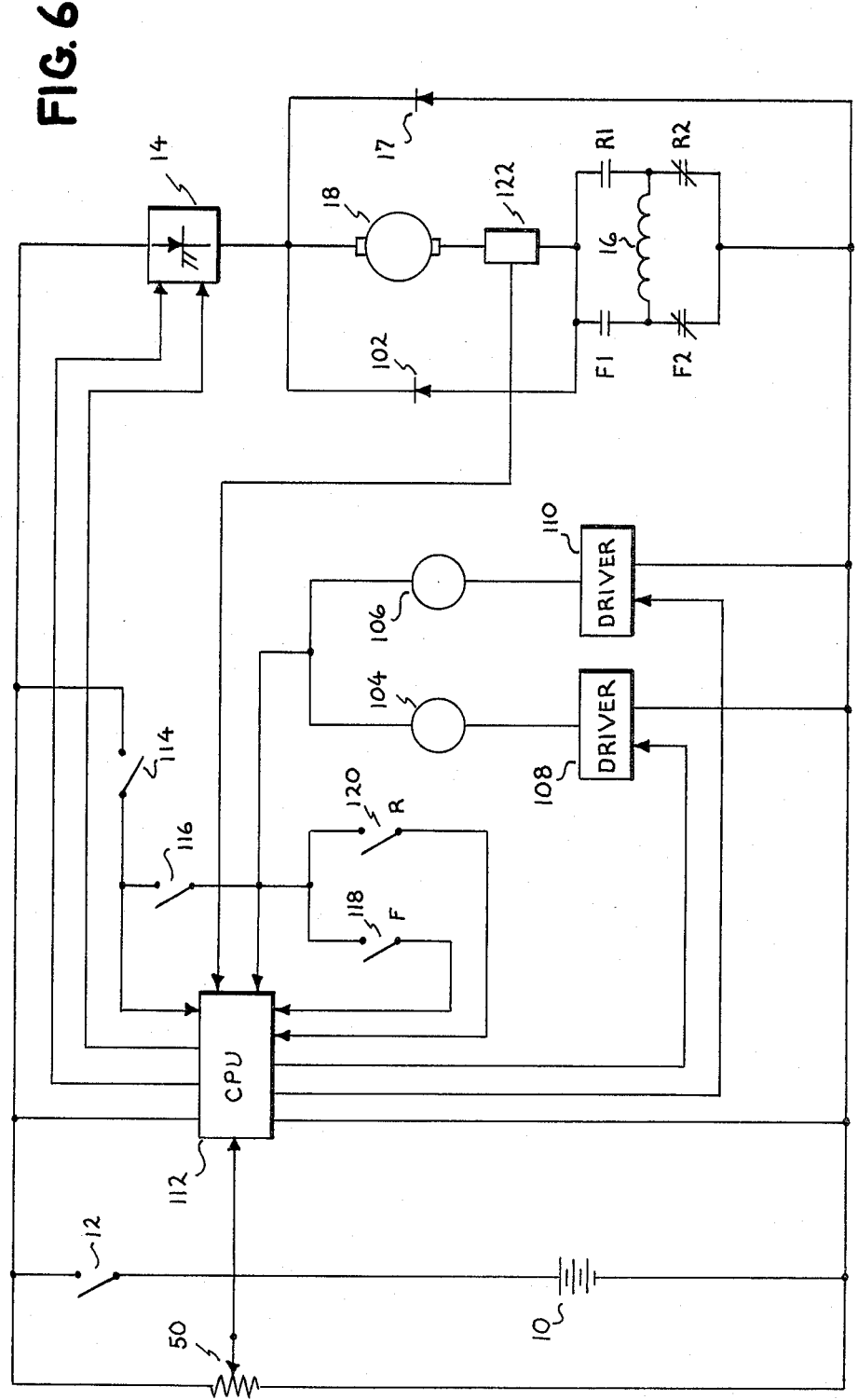
FIG. 6 is a simplified block diagram of a microcomputer implemented control system in accordance with the present invention.

Although the functional block diagram of FIG. 4 is believed sufficient to enable those skilled in the art to make and use the present invention, reference is now made to FIG. 6 wherein there is illustrated a preferred implementation of the invention using a microprocessor based arrangement. The basic power circuit for the DC motor comprising armature 18 and field winding 16 includes a variable mark-space ratio chopper circuit 14 and a key switch 12 which serve to connect the motor across the battery 10. Preferably chopper circuit 14 comprises a silicon controlled rectifier (SCR) chopper circuit including a controllable commutation circuit and associated commutating capacitor. A typical chopper is shown in U.S. Pat. No. 3,826,959 issued July 30, 1974 and assigned to General Electric Company. The freewheeling diode 17 provides a path for inductive current when chopper circuit 14 switches to a non-conductive state. A plugging diode 102 connected in reverse parallel with armature 18 provides a reverse current path to prevent self-excitation during electrical braking.

The field winding 16 is arranged to be connected in either a forward or reverse direction in series with armature 18, where forward and reverse refer to the direction of rotation of the motor armature 18, by means of contacts F1, F2 and R1, R2. The contacts F1, F2, R1 and R2 are shown in their normal de-energized state. Control of contacts F1 and F2 is through a contactor actuating coil 104 while contacts R1 and R2 are controlled by a contactor actuating coil 106. The coils 104 and 106 are connected across the battery 10 by means of respective contactor driver circuits 108 and 110. The driver circuits 108 and 110 may be in the form illustrated in co-pending application Ser. No. 299,047 filed Sept. 1, 1981 and assigned to the General Electric Company.

The control functions are implemented in a central processing unit (CPU) 112 which includes the necessary hardware such as counters, registers, memory units and microprocessors for performing those functions described in FIG. 4. The CPU 112 is connected to perform selected safety checks by monitoring the status of a seat switch 114, a brake switch 116 and forward and reverse direction switches 118 and 120. The accelerator 50 also provides an input signal indicative of the percent accelerator pedal depression to the CPU 112. Motor armature current sensing is provided by a sensor 122 connected in series with armature 18.

Figure 7:
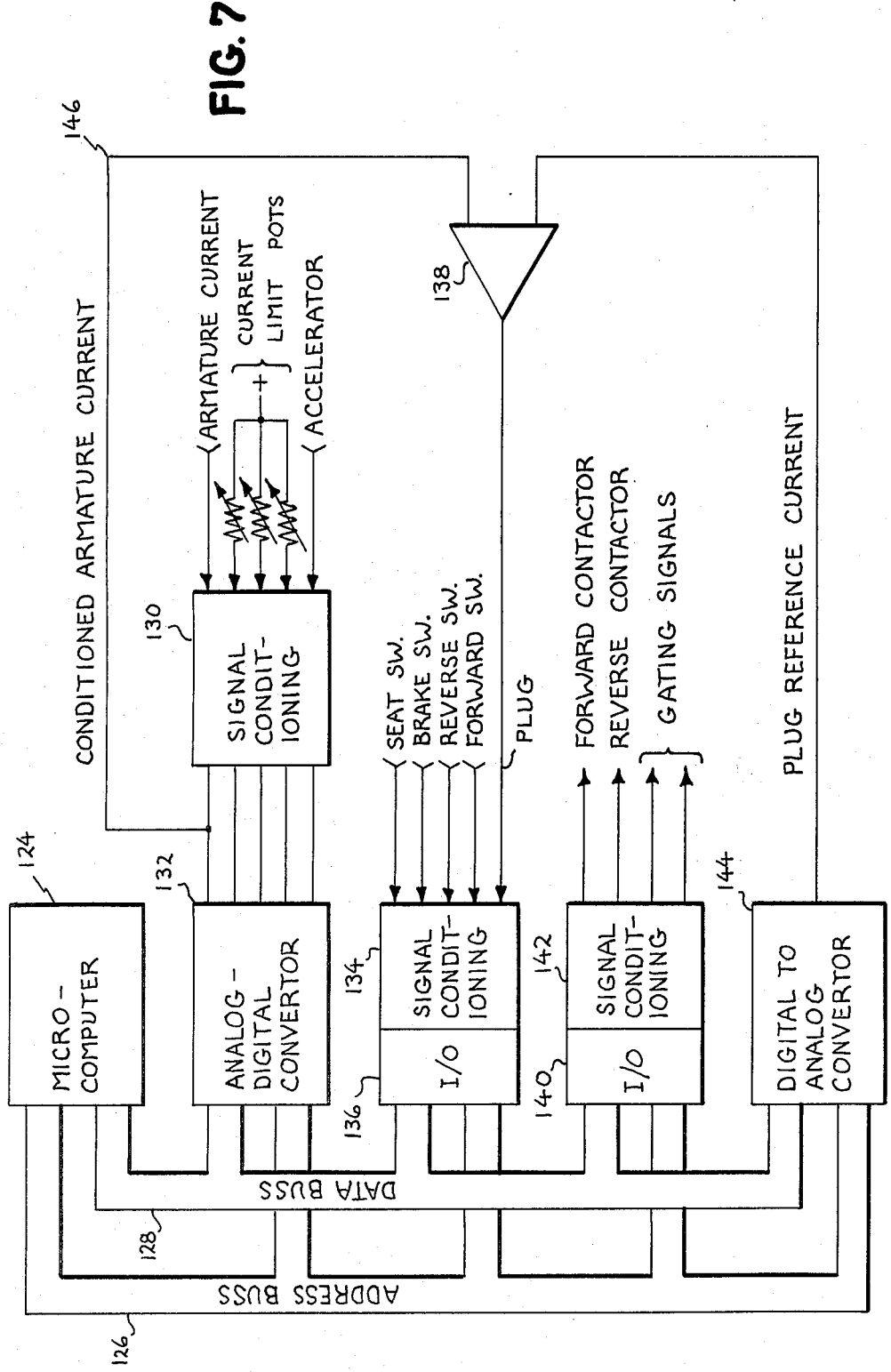
FIG. 7 is an expanded block diagram of the microcomputer system of FIG. 6.

Referring now to FIG. 7, the CPU 112 is shown in more detail. A microcomputer 124 is coupled via an address bus 126 and a data bus 128 to a plurality of input/output interfaces. The microcomputer 124 preferably comprises a type 6502 microprocessor available from Rockwell International Corp., a type 74LSI38 addess decoder available from Texas Instruments, Inc., and addressable random access memory (RAM) and read only memory (ROM) sufficient for program storage and storage of intermediate and computed or monitored variables. Intel Corp. types 2114 and 2716 are suitable for RAM and ROM, respectively.

A first signal conditioning circuit 130 is connected to receive the armature current signal from sensor 122. The signal conditioning circuit 130 adjusts the amplitude of input signals to a level compatible with the apparatus connected to its output terminals, in this instance an analog to digital (A/D) converter 132. A/D converter 132 may be, for example, a type ADC0816 available from National Semiconductors, Inc. The digitized output signals from A/D converter 132 are coupled onto the address and data busses 126 and 128 under control of the microcomputer 124. In addition to the armature current signal, the accelerator pedal position signal and various current limit signals are also coupled to the microcomputer 124 through signal conditioning circuit 130 and A/D converter 132.

A second signal conditioning circuit 134 provides an interface between microcomputer 124 and those system signals which are of a binary nature, i.e., those signals representative of switches being open or closed or of the system being in a propulsion or braking mode of operation. An input/output (I/O) interface circuit 136 couples the signals from signal conditioning circuit 134 to the address and data busses 126 and 128. The I/O circuit may be, for example, a type 6522 available from Rockwell International Corp. As illustrated, the signal conditioning circuit 134 monitors the status of seat switch 114, brake switch 116, forward direction switch 118 and reverse direction switch 120. A plug signal developed by a comparator 138 is also monitored by circuit 134. The plug signal is provided during electrical braking and switches between a first state when motor armature current is greater than the desired magnitude of plug current and a second state when motor armature is less than the desired magnitude of plug current.

Command signals developed by the microcomputer 124 are coupled through an I/O interface 140 and signal conditioner 142 to the control devices, e.g., the forward/reverse contactor driver circuits 108 and 110 and the switching devices within chopper circuit 14. The I/O interface 140 may also be a Rockwell International type 6522 device. The signal conditioning circuit 142 is a driver amplifier and level shifting circuit of a type well known in the art.

Also connected to the address and data busses 126 and 128 is a digital to analog (D/A) converter circuit 144 whose function is to provide an analog output signal representative of the desired magnitude of braking current during electrical braking or "plugging." The D/A circuit 144 may be a type AD558 available from Analog Devices, Inc. The signal from D/A circuit 144 is coupled to an input terminal of comparator 138 for comparison to the actual motor current signal. It will be noted that the motor current signal is conditioned or scaled in signal conditioning circuit 130 before being coupled via line 146 to an input terminal of comparator 138.

Figure 8:
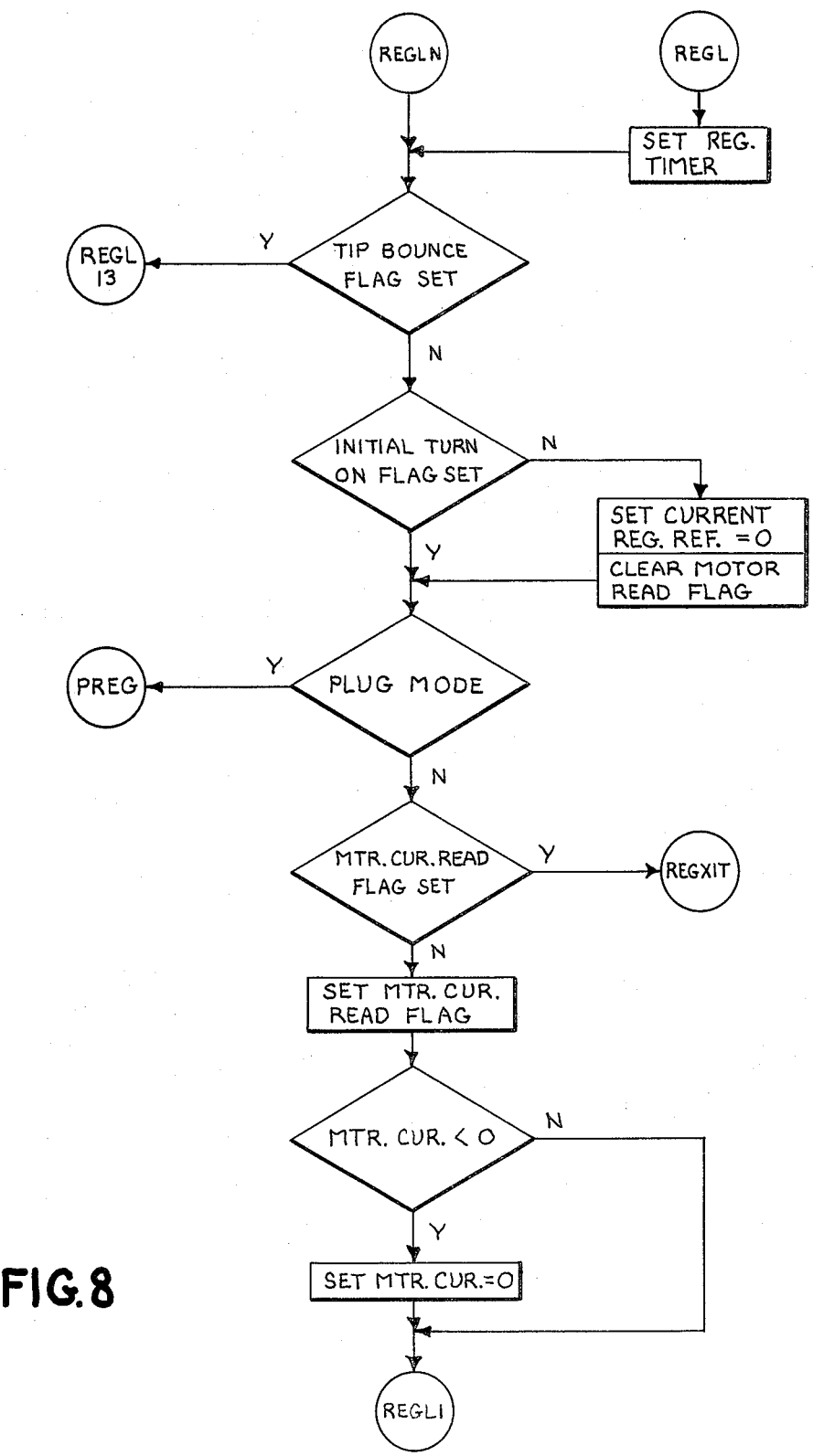
FIGS. 8-15 represent flow diagrams for software implementation of the control system of FIG. 7.

Functionally, the microcomputer implemented regulator circuit of FIGS. 6 and 7 operates substantially as shown in the functional block diagram of FIG. 4. Appendix A represents the software program for implementing the functions described in the functional block diagrams. Referring now to FIG. 8 et seq., there is shown a more precise flow diagram of the current regulator function. In the motoring mode the regulator routine is entered at REGLN. Whenever a contactor, such as the forward or reverse contactors, is energized, it is desirable to inhibit the regulator function in order to avoid oscillations which might be caused by contact tip bouncing. The regulator routine includes a provision for setting a tip bounce timer during the first pass through the routine. During the inhibit interval, typically about twenty milliseconds, only current update functions are permitted, i.e., no gating pulses to the chopper 14 are generated. During each pass, the routine checks the status of a tip bounce flag to determine if the timer has timed out. If the tip bounce flag is set indicating that the timer has not timed out, the routine goes into a secondary loop at REGL13 to be described infra. If the tip bounce flag is not set the routine checks to determine if the drive motor is currently energized, i.e., if chopper circuit 14 has been operating, by checking the status of a flag (initial turn on flag) which is set when gating signals are supplied to chopper circuit 14. If the motor has not been energized, the routine branches into a zero set mode and sets the current reference to zero or an initialized condition and then returns to the main routine.

Since the normal current limit function is distinct from the plug current limit function, the routine checks whether the system is in an electrical braking, i.e., plug, mode or a propulsion mode. If the plug flag is set, the routine branches into a plug regulation mode (PREG) to be described infra. In the propulsion mode, motor current is read at the same time during each chopping cycle of chopper circuit 14. A flag (MTR. CUR. READ) is set during that time to inhibit regulator operation for a time period, approximately 100 microseconds, sufficient to allow the reading to be taken and settle before it is sample. The flag is cleared at the end of each reading cycle. When the routine detects that the flag has been cleared, thus indicating that a new reading is available, the routine sets the READ flag for the next cycle. If the READ flag is set when this point in the routine is reached, the routine is exited (REGXIT) for the present cycle.

MOTOR CURRENT<0 is intended to eliminate amplifier drifts at or near zero motor current. Since motor current should always be a positive value, this step checks that value and, if it is positive, saves the value for future use. If negative, motor current is set to zero and saved.

Figure 9:
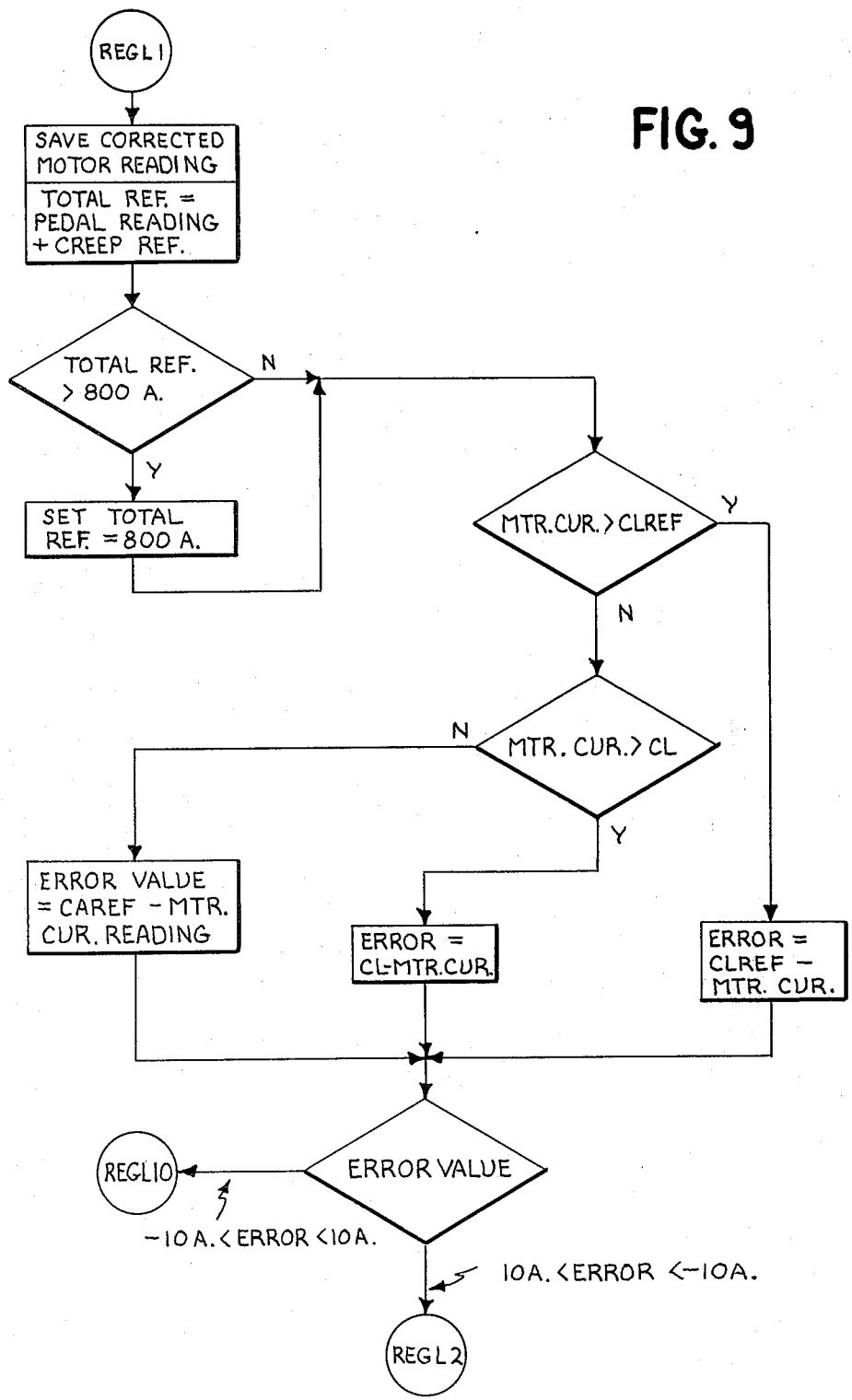
Figure 10:
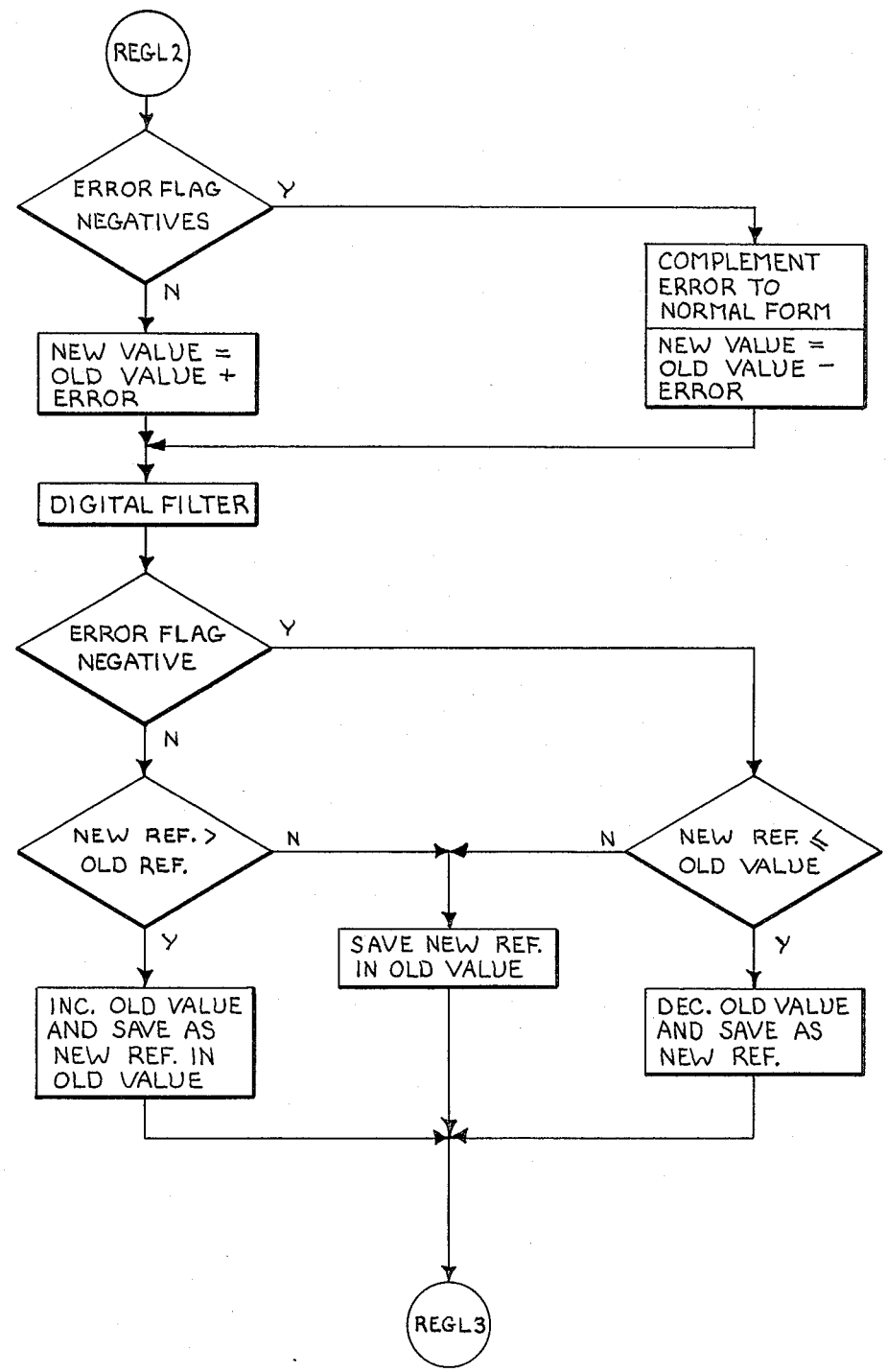

Beginning at FIG. 9 a motor current reference value (TOTAL REF.) equal to the sum of the accelerator pedal reading plus a creep reference is compared against a maximum current limit. The pedal reading may be limited, as previously described, by the controlled acceleration or current limit functions. The creep reference is a small offset reference value intended to keep strain on gearing in the vehicle without any pedal depression so as to minimize gear slap at start-up. If the motor current reference value is greater than the maximum permitted value, e.g., 800 amperes, the reference is set to 800 and the routine continues. If the reference value is less than 800 amperes, the routine proceeds using the actual value.

Several comparisons next occur for determining whether the desired motor current, i.e., the reference value, exceeds various current limit functions. One step compares the reference value against a commutation limit reference (CLREF) which varies as a function of percent on time of chopper circuit 14. Another step compares the reference value against a predetermined maximum current limit (CL) value. The smaller of the CLREF or CL determines the magnitude of error signal in the event that the reference value exceeds either or both of them. If the reference value is less than CLREF or CL, the error signal is computed to be the difference between the controlled acceleration value (CAREF) and the motor current reading.

The next step is essentially a dead band check, i.e., if the error value is less than a predetermined minimum, e.g., plus or minus 10 amperes, a jump is made to a later point in the routine. The jump avoids a filter circuit and prevents oscillations for small errors. If the error is outside the dead band, a determination of error polarity is necessary. The polarity check (ERROR FLAG NEGATIVE) directs a complement of negative errors (the actual value is in two's complement form) in order to compute a new motor current reference value equal to the old value minus the error. Positive errors are added directly to the old value to obtain the new value. A digital filter smooths the computed new motor current reference value to prevent step-function changes.

ERROR FLAG NEGATIVE is used again for the purpose of determining the polarity of the error value in order to determine whether to increment or decrement the old reference value. For a positive error, if the new reference value is less than or equal to the old reference value, the old value is incremented and saved as the new value. If the new reference value is greater than the old value, the new value is substituted for the old value. For a negative error, the old value is decrement if the new reference value is equal or greater than the old value. Otherwise, the new reference value is substituted for and becomes the old value.

Figure 11:
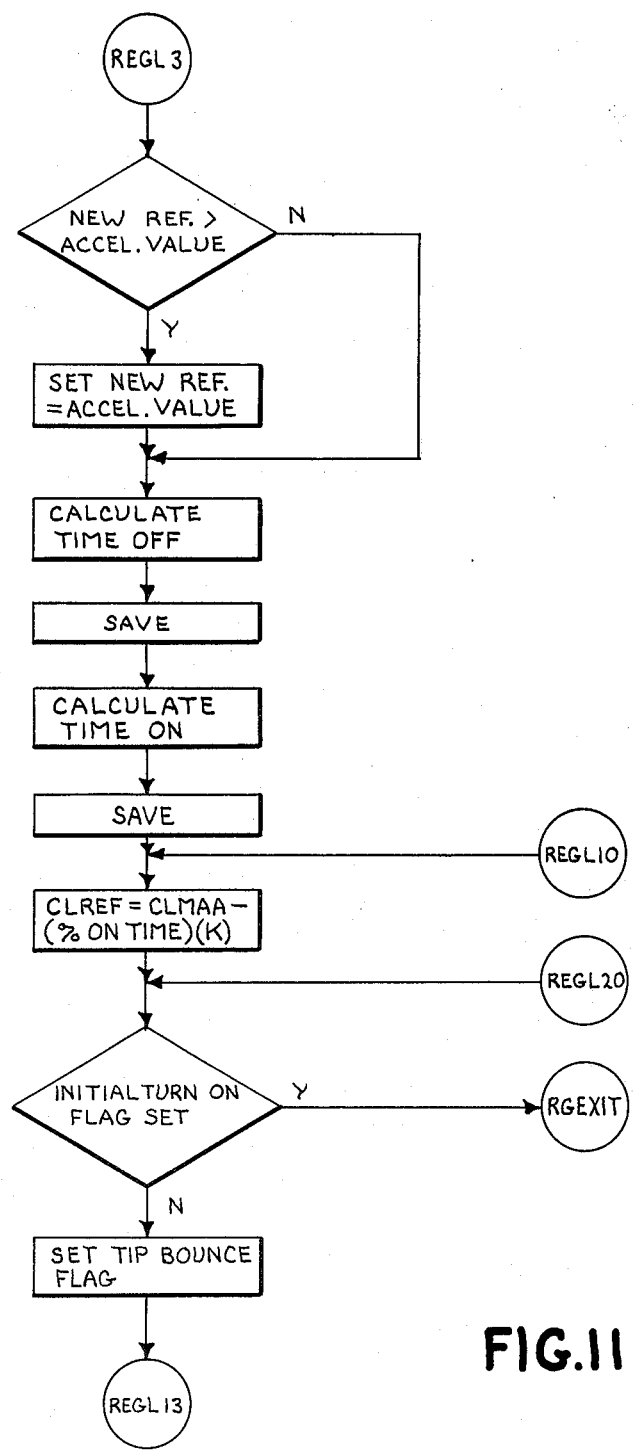

Before applying the new reference motor current value to control the chopper circuit 14, this value is compared with the voltage limit value established by the accelerator pedal position. Referring to FIG. 11 if the new current reference value exceeds the accelerator position value, the new value is set at the accelerator position value. Otherwise, the new value is applied directly to compute the off-time and the on-time of chopper circuit 14. The computed off-times and on-times are then used to generate gating signals for the switching devices in the chopper circuit 14.

Once the off-time and on-time have been computed, their ratio is then used to calculate CLREF, i.e., the commutation limit reference described supra. Note that the regulator routine is also entered at this point if the error value computed earlier had been less than the predetermined value, i.e., the exit at REGLIO enters the routine after calculation of on-time and off-time. It will be apparent that for small errors, e.g., less than two amperes, the previously used on and off-times are again suitable for controlling chopper circuit 14.

After computation of the times for energizing the circuit 14, the routine checks to determine if this is the first time that the circuit 14 has been energized. If an initial turn-on flag is set, the routine exits (REGXIT) to the executive program to perform other functions. Otherwise, the routine continues by setting the tip bounce flag.

Figure 12:
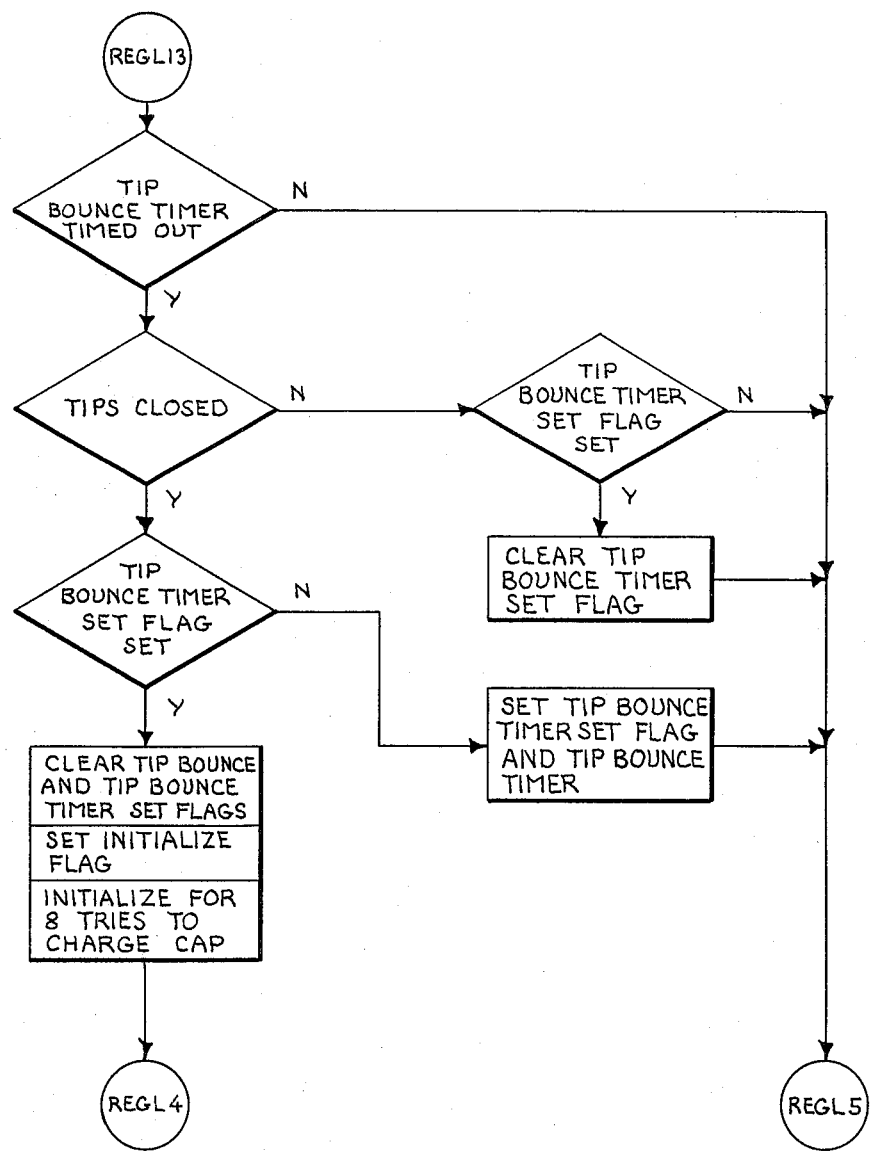
Figure 13:
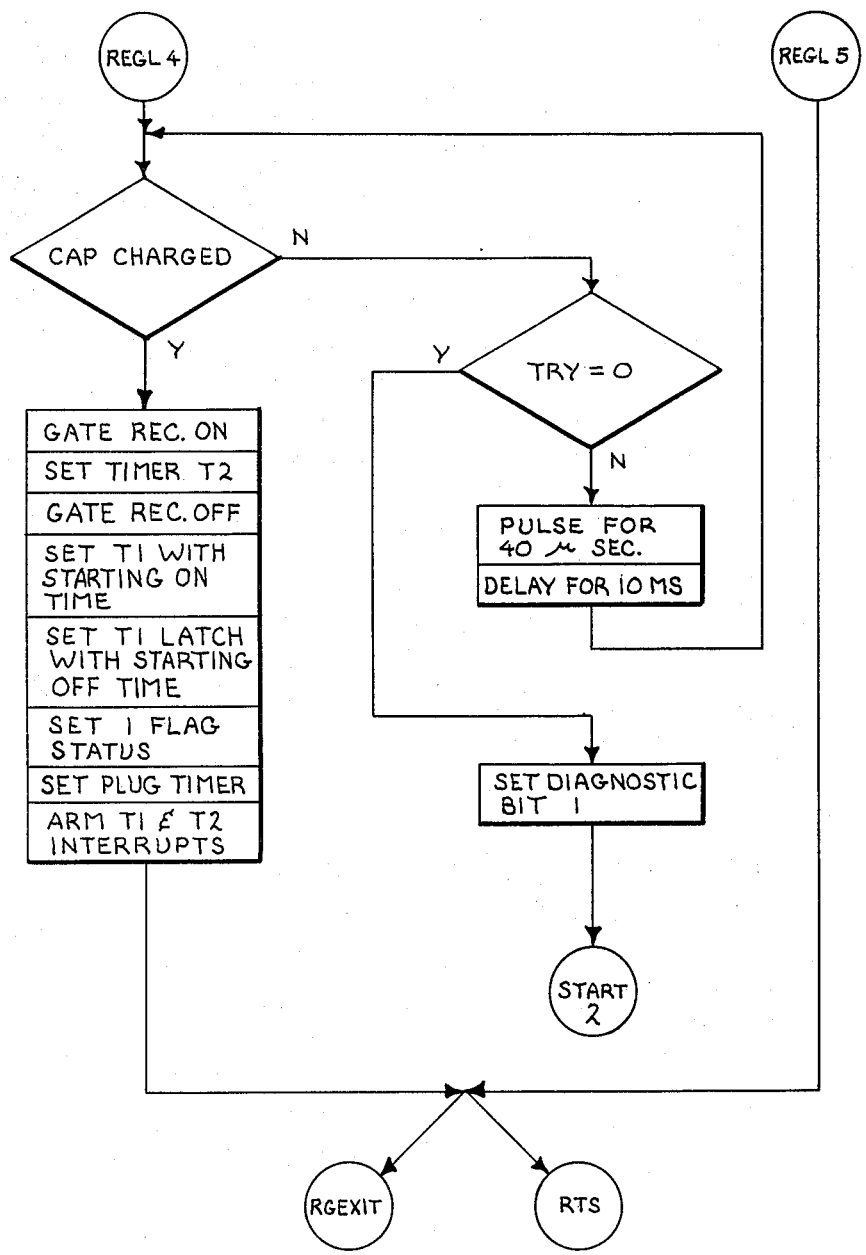

Referring to FIG. 12, if the tip bounce timer has timed out, the contact tips are detected to be closed and the tip bounce timer set flag is set, then the routine proceeds to clear the tip bounce and tip bounce timer set flags and to set the chopper 14 initialize flags. The chopper 14 is then initialized, in FIG. 13, by gating the switches to provide an initial commutating charge on the commutating capacitor. Charging of the capacitor is verified before providing signals to gate the main SCR switch in the chopper into conduction for the previously calculated on-time to thereby supply power to the motor.

If the flag is set in any of the above checks in FIG. 12 so as to indicate that the monitored condition is negative, the routine exits back to the executive program momentarily rather than wait for the monitored condition to clear. The routine clears the tip bounce timer set flag before exiting if the tips are closed and the timer flag is set. If the tips are not closed, the tip bounce timer set flag and tip bounce timer flag are set before exiting.

A try-again function is provided in the event that the commutating capacitor doesn't indicate a charge after first initialization.

Figure 14:
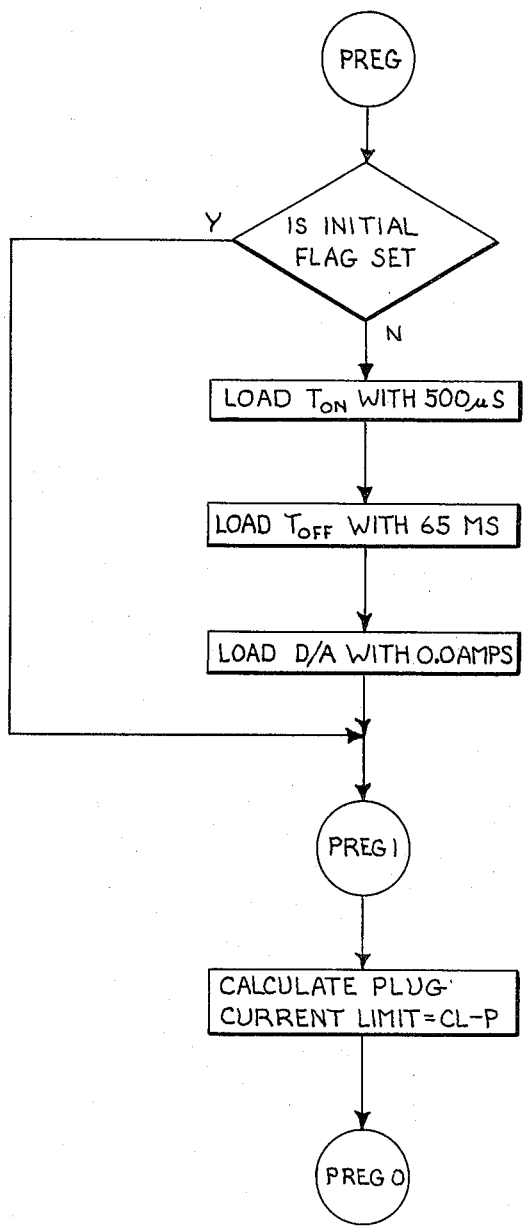

Referring briefly to FIG. 8, it will be recalled that the regulator routine early checks to determine whether the system is in a propulsion or an electrical braking, i.e., plugging, mode of operation. The regulator routine exit at PREG causes a jump to a plugging regulator sub-routine whose flow diagram is illustrated in FIG. 14. The plugging function is implemented by sensing that the direction switches 118 and 120 have been cycled. The logic function is established in the CPM 112 such that once the percent on-time for chopper circuit 14 has exceeded a predetermined value, e.g., twelve percent, CPU 112 remembers which direction the vehicle is being propelled, i.e., which contactor 104 or 106 is energized. If the direction switch is then moved to energize the other contactor, a plug flag is set. A set-up time for plugging is provided by de-energizing the CPU 112 clock oscillator when the direction switch passes through neutral.

The regulator function is, to a certain extent, interrupt driven. The routine is serviced on a time basis from the executive program but has selected flag conditions, such as have been described above, which inhibit regulator operation. In the plug mode one such interrupt is the output signal from comparator 138 (see FIG. 7). If the relationship between the relative value of current called for by accelerator 50 and the actual sensed armature current has not changed since the last regulator cycle, the present cycle is inhibited. In addition, if the comparator 138 switches before a predetermined minimum time has elapsed since the last gating pulse to chopper 14, the interrupt from comparator 138 is ignored. This last feature prevents double pulsing, i.e., a situation wherein the first current pulse through chopper 14 forces motor current to just below the desired level and the second pulse forces a large overshoot current causing a cogging or jerking effect in electrical braking.

Although plugging current can be regulated in the same manner as motoring current, i.e., by varying both the conducting time and non-conducting time of the chopper 14, the relatively low percent on-times required to maintain a desired braking effort permit simplification of the control of chopper 14. In the illustrated embodiment, the on-time of chopper 14 has been chosen to be a fixed value of 500 microseconds. Motor plugging current is then regulated by varying the off-time. However, as stated previously, a minimum off-time, e.g., three milliseconds, is provided before another on-time is permitted. These relative values establish a minimum percent on-time of about fourteen percent. Preferably, plugging is cancelled before the minimum percent on-time is reached. In actual measurements, the onset of plugging at a relatively high speed might yield a percent on-time as low as one-half percent. By the time the vehicle slows to about fifteen percent speed, the percent on-time will have increased to only about three to four percent. However, between fifteen percent speed and zero, the plugging current must increase dramatically to maintain braking torque. It, therefore, becomes desirable to terminate plugging when the percent on-time reaches about twelve percent and to thereafter relay on mechanical brakes for stopping.

Figure 15:
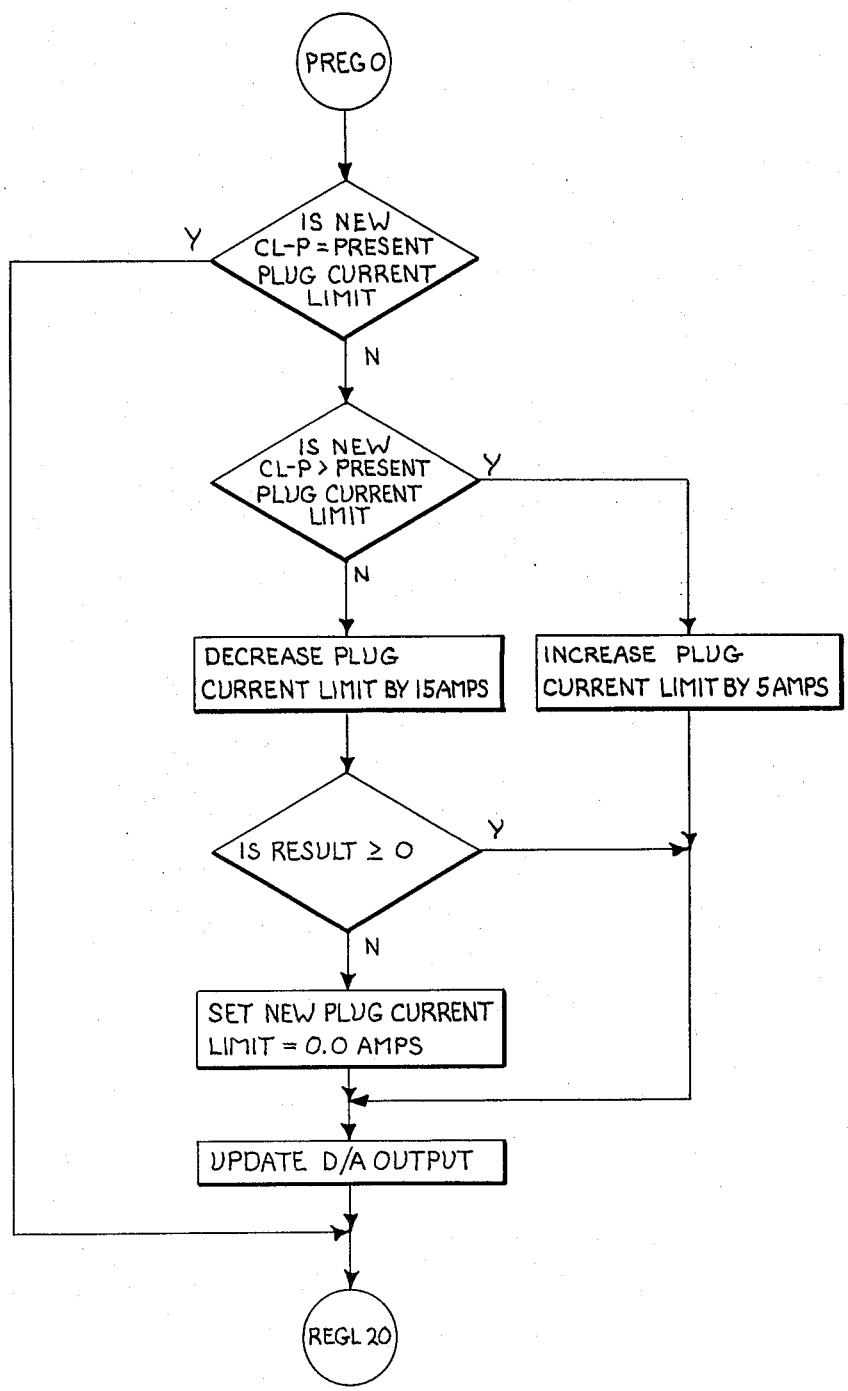

The detail plugging routine is given in Appendix A. The flow diagram of FIG. 14 and FIG. 15 illustrate the process described supra. If the initialization flag is set when the routine is entered, a jump is made to the calculation steps (PREG1) for establishing and computing current values. Otherwise the initializing values are loaded into the respective timers and associated latches. The 500 microsecond on-time is loaded followed by loading of a 65 millisecond timer. This latter timer provides a plug cancel function by keeping track of the total off-time. For the present system, it is assumed that plug should be cancelled if the minimum plug current limit is not reached within this time period. The D/A convertor 144 is also initialized at zero amps.

After initialization, the plug current limit is calculated as a function of PLPR (plug limit pot reference) and acceleration position. The calculated limit is then compared to the last calculated limit value to determine if there has been a change, i.e., if the accelerated has been moved to call for more or less braking effort. If the values are the same, the plugging exits to REGL20 in the regulator routine (FIG. 11). If the limit values are different, the reference is either increased by a fixed amount or decreased by a fixed amount. The D/A convertor 144 is then loaded with the new value and the subroutine exited to the normal regulator routine for generation of gating signals and calculation of off-times.

Increasing or decreasing the current limit values by fixed amounts tends to smooth the braking effort to minimize cogging. Exemplary values have been chosen to be a five ampere increase and a fifteen ampere decrease. After a decrease, the routine checks to assure that negative currents are not computed and sets the convertor 144 to zero if negative values are detected.

The flow diagram of FIGS. 8-15 in conjunction with Appendix A is believed to provide a complete disclosure of a presently preferred form of current regulator in accordance with the present invention. It will be apparent that various modifications of the microcomputer implemented version of the invention are possible without departing from the true spirit and scope of the invention. It is therefore intended that the appended claims not be limited to the detailed implementation but cover all such modifications as fall within the spirit and scope of the invention.

What is claimed is:

1. In combination with apparatus for regulating the torque developed by a direct current electric traction motor in an electric powered vehicle, the apparatus being of the type wherein power to the motor is controlled by a time-ratio switching regulator alternately conductive and non-conductive to connect and disconnect the motor to a source of direct current power and wherein the switching regulator is controlled by gating signals supplied at varying time intervals to adjust the ratio of conducting to non-conducting time in response to an accelerator position signal produced by an accelerator on the vehicle, the improvement comprising:
(a) means for sensing the actual motor current to provide a signal representative of said actual motor current;
(b) means for developing a current reference signal representative of accelerator position;
(c) means for developing a voltage limit signal representative of accelerator position;
(d) means responsive to said actual motor current signal and said current reference signal for producing an error current signal representative of any difference between the current reference signal and the actual motor current signal;
(e) means responsive to the error current signal to produce a command signal representative of the ratio of conducting to non-conducting time of the switching regulator tending to minimize the error current signal;
(f) means responsive to the voltage limit signal and the command signal for limiting the command signal to a corresponding time ratio value not exceeding the time ratio value corresponding to the voltage limit signal; and,
(g) means for applying the value limited command signal to control the conduction time of the switching regulator.

2. A method for regulating the torque developed by a direct current electric traction motor in an electric powered vehicle, power to the motor being controlled by a time-ratio switching regulator alternately conductive and non-conductive for connecting and disconnecting the motor to a source of direct current power, the regulator being controlled by gating signals supplied by signal processing means at varying time intervals in a manner to adjust the ratio of conducting to non-conducting time in response to an accelerator position signal produced by an accelerator on the vehicle, comprising the steps of:

providing from a current sensing means a signal to the processing means having a value representative of current in the motor;

developing a current reference signal having a value representative of accelerator position;

developing a voltage limit signal having a value representative of accelerator position;

calculating an error current value representative of any difference between the current reference signal and the sensed motor current signal;

converting the error current value to a command signal having a value representative of the ratio of conducting to non-conducting time of the switching regulator tending to minimize the error current value;

limiting the command signal to a value not exceeding the value of the voltage limit signal; and applying the value limited command signal to control the conduction time of the switching regulator.

3. The method of claim 2 wherein the signal processing means comprises a microprocessor having a central processing unit operable according to a stored program of instructions for directing the central processing unit to cyclically convert the error current value to the command signal value, wherein the step of applying the command signal to the switching regulator comprises the sub-steps of:

computing a conducting time interval for the switching regulator to force current in the motor to a predetermined value;

computing a non-conducting time interval such that the ratio of conducting to non-conducting time tends to force the average motor current to value representative of accelerator position;

generating a gating signal to cause the switching regulator to become conductive; and, generating a gating signal to cause the switching regulator to become non-conductive at the end of the computed conducting time interval.

* * * * *